March 1, 1966

G. W. GILMORE 3,237,353

PORTABLE LOGGING SPAR

Filed June 18, 1962

INVENTOR.
GEORGE W. GILMORE

BY
BUCKHORN, CHEATHAM & BLORE
ATTORNEYS

March 1, 1966  G. W. GILMORE  3,237,353
PORTABLE LOGGING SPAR
Filed June 18, 1962  3 Sheets-Sheet 2
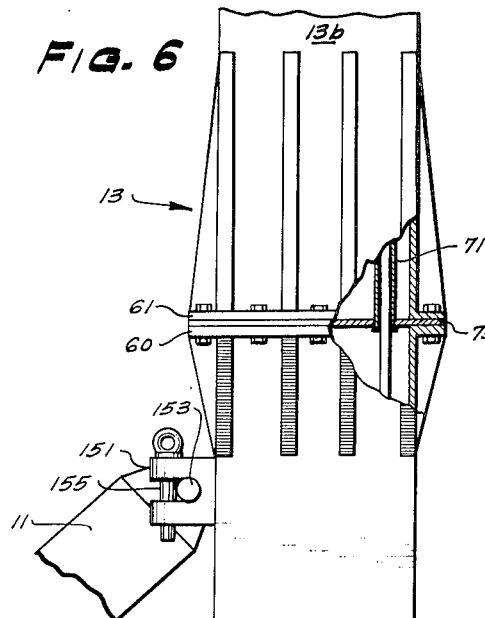
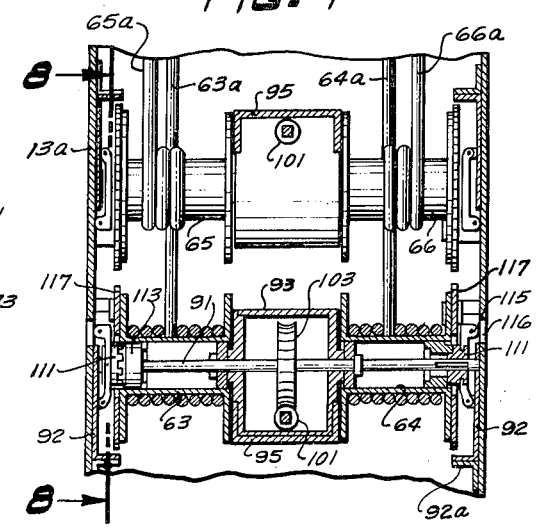
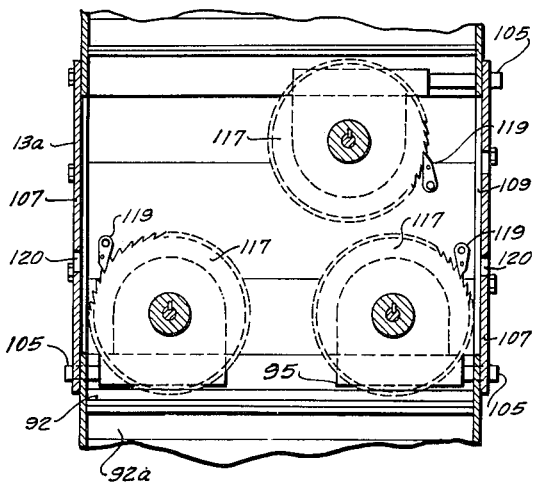
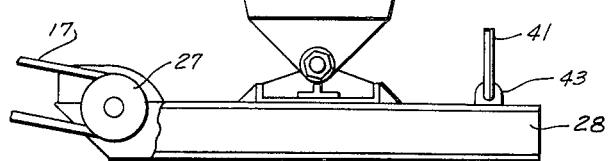
INVENTOR.
GEORGE W. GILMORE
BY
BUCKHORN, CHEATHAM & BLORE
ATTORNEYS March 1, 1966
G. W. GILMORE
3,237,353
PORTABLE LOGGING SPAR
Filed June 18, 1962
3 Sheets-Sheet 3
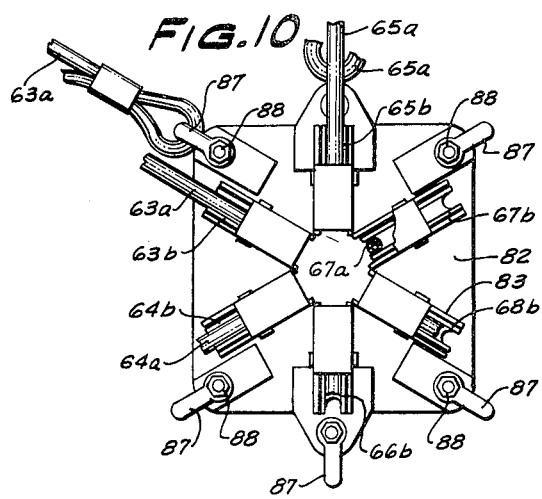
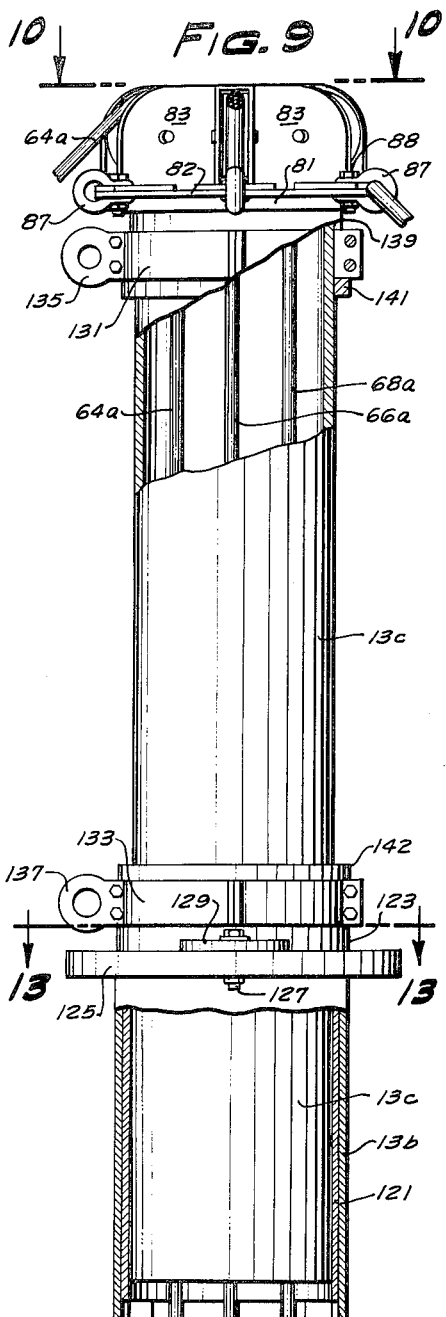
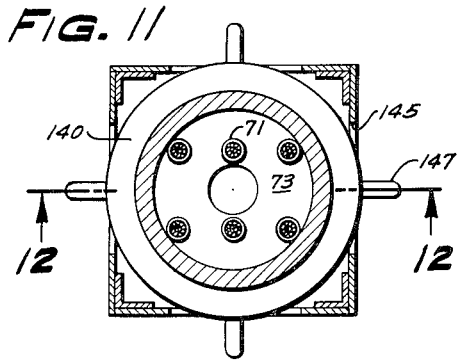
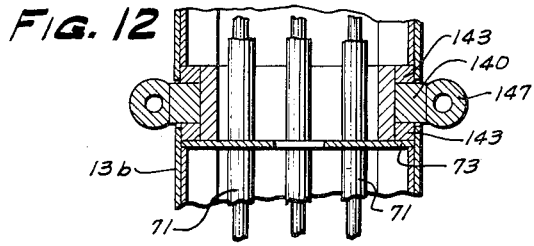
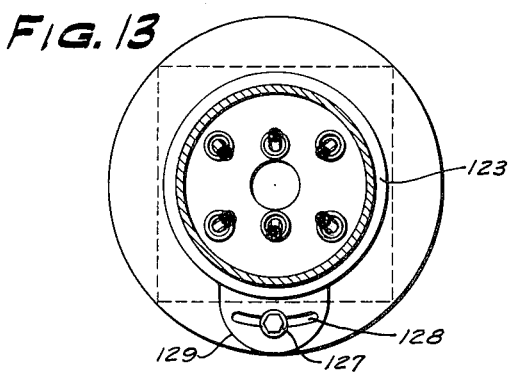
INVENTOR.
GEORGE W. GILMORE
BY
BUCKHORN, CHEATHAM & BLORE
ATTORNEYS

United States Patent Office 3,237,353
Patented Mar. 1, 1966

3,237,353
PORTABLE LOGGING SPAR
George W. Gilmore, P.O. Box 538, Molalla, Oreg.
Filed June 18, 1962, Ser. No. 203,083
2 Claims. (Cl. 52—116)

This invention relates to portable logging spar apparatus of the vehicle mounted type. My prior Patent 2,880,827 shows such an apparatus.

One disadvantage of most prior portable spar apparatus is that when the spar is erected, the guy lines extend downwardly alongside the spar where they can be damaged or become entangled in equipment or logs being handled.

It is a main object of the present invention to provide a portable spar apparatus in which the guy lines are not so exposed, but instead extend downwardly within the spar, which is hollow.

Another disadvantage of prior portable spar apparatus is that the self-powered vehicle upon which the spar is mounted and which transports the spar from place to place is of special design and/or is usable only for winch powering operations after the spar is erected.

Another object of the present invention is to provide a portable spar apparatus which includes a conventional crawler tractor or similar vehicle which is separable from the remainder of the apparatus after the spar is erected to enable the crawler tractor to be used for other purposes.

Still another disadvantage of prior portable spar apparatus is that the spar must be erected and lowered very carefully and if brought to rest during such operation, this must be done very gently in order to avoid dangerous whip and damage to the spar.

A further object of the invention is to provide a portable spar apparatus in which the spar is specially and automatically reinforced when being lowered or raised by a simple and inexpensive device which enables the spar to be raised or lowered rapidly and stopped abruptly at any place during such operations without danger of damage to the spar.

Various other objects of the invention will be apparent from the following description taken in connection with the accompanying drawings wherein:

FIG. 6 is an enlarged view of the lower portion of the erected spar, with parts broken away to show the mechanism located within the spar;

FIG. 7 is a sectional view taken along line 7—7 of FIG. 6, on an enlarged scale;

FIG. 8 is a vertical section taken along line 8—8 of FIG. 7;

FIG. 9 is an enlarged view of the upper portion of the spar, with parts broken away to show interior construction;

FIG. 10 is a top end view of the spar taken in the direction of the arrows 10—10 in FIG. 9;

FIG. 11 is a transverse section taken along line 11—11 of FIG. 4;

FIG. 12 is a vertical section taken along line 12—12 of FIG. 11; and

FIG. 13 is a transverse section taken along line 13—13 of FIG. 9.

Figure 1:
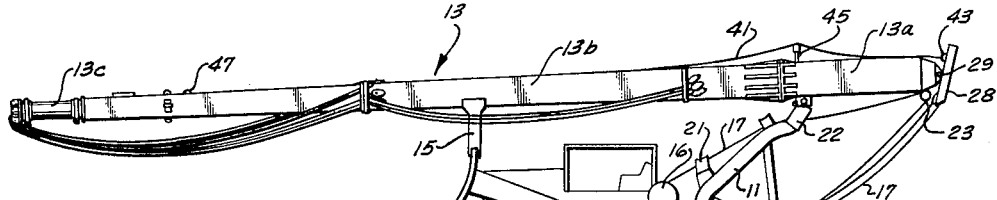
FIG. 1 is a diagrammatic view of a portable spar apparatus of my invention in its carrying position.

Referring to FIG. 1 of the accompanying drawings, a conventional powered vehicle in the form of a crawler tractor T is connected by a vertical pivot pin hitch means 9 to the front lower end of the boom 11 of a trailer vehicle in the form of a conventional logging arch A. A spar unit, which includes a spar 13, is pivotally mounted in a manner to be presently more fully explained at its lower portion on the rear upper end of the arch boom 11 for movement from the horizontal inoperative position shown in FIG. 1 to the vertical operative position shown in FIG. 4. In its horizontal position, the spar is jointly supported by the boom 11 and by a rest device 15 mounted on the blade of the tractor T.

Figure 5:
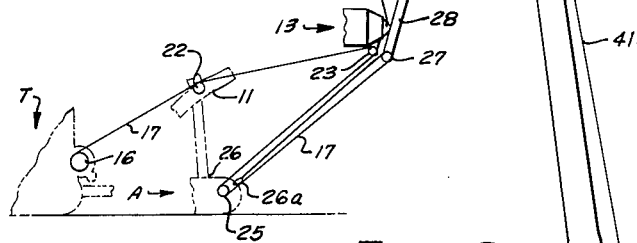
FIG. 5 is a diagrammatic view showing the manner of reeving of the spar erection cable.

Spar 13 is adapted to be erected by the operation of mechanism including a power driven winch drum 16 on the rear end of the tractor. The winch drum has a spar erecting line 17 which extends through guides 21 and a roller type fairlead 22 (FIG. 5) on the boom 11, and then is reeved around a sheave 23 on the lower end of the spar 13, then extends to a series of sheaves 25 (FIG. 7) on the frame 26 of the arch and then back and forth between such sheaves and a series of sheaves 27 on each edge of a base block 28 and then is releasably anchored to the frame 26 at 26a. For convenience, only a single sheave is shown in FIG. 5 for each of the groups of sheaves 25 and 27. The base block 28 is pivotally connected at 29 at approximately its center to the lower end of the spar 13.

Figure 2:
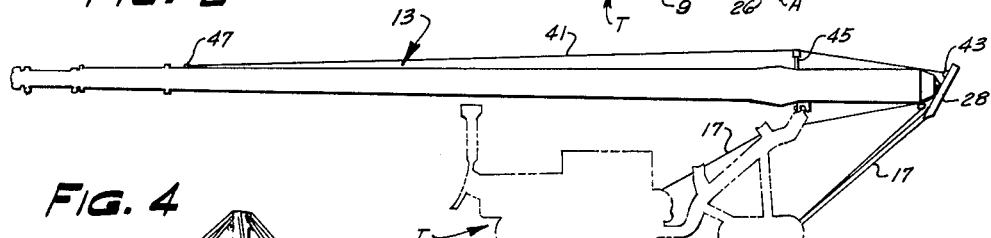
FIGS. 2, 3 and 4 show the apparatus in various stages of its erection.
Figure 3:
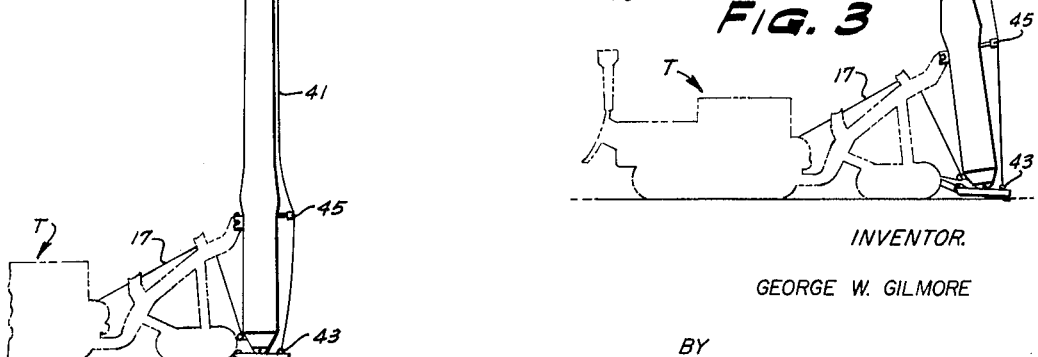

As is apparent from FIGS. 1, 2 and 3, the erecting line 17, when taut, urges the base block 28 to assume a position in which the axes of the sheaves 27 are aligned with a plane which extends through the pivot 29 and the sheaves 25. This means that when the spar is disposed in its horizontal position, the base block 28 will be urged to assume a position of considerable obliqueness to the length of the spar but as the spar is moved to its erect position, the block will be urged to assume a more nearly normal position relative to the spar.

The above described movement of the base block is used to achieve several advantages. One of these advantages is a temporary stiffening of the spar during raising and lowering of the spar to prevent excessive bending and thus resultant damage to the spar. To achieve this advantage, a pair of truss cables 41 are provided for the spar 13. One set of ends of these truss cables is dead ended at 43 (FIG. 1) to the base block 28 on the side thereof opposite the sheaves 27. The truss cables extend from the block 28 along the top side of the spar 13 (as the parts are depicted in FIG. 1) over a bridge 45 and then are dead ended to ears 47 located near, but spaced from, the upper end of the spar.

The truss cables have a length such that they are slack in the vertical position of the spar, or whenever the base block 28 is normal or nearly normal to the length of the spar 13, such as in the horizontal position shown in FIG. 1. However, the amount of slack is small. Thus, as the spar is lifted from its horiozntal position and the block 28 is caused (for reasons explained above) to assume the oblique position of FIG. 2 relative to the spar, the ends of the cables 41 which are secured to the block 28 are moved away from the other set of cable ends to remove the slack in the cables and to tension them. This tension counteracts the tendency of the spar to bend while being raised or lowered, and prevents overstressing of the spar if it is stopped abruptly during raising or lowering operations.

Referring to FIG. 1, the spar 13 comprises three primary sections, a base section 13a, a long intermediate section 13b, and an upper section 13c. As best shown in FIG. 6, the base section 13a has an upper flange 60 bolted to a bottom plate 61 on the intermediate section 13b to permit separation of the two when desired, such as in transporting the spar from factory to the place of use. The sections 13a and 13b are of square cross section whereas the section 13c is of circular cross section.

Referring to FIGS. 6, 7 and 8, three pairs of guy cable winch drums, 63 and 64, 65 and 66, and 67 and 68 are mounted in the lower portion of the lower section 13a for rotation about horizontal axes. The drums of each pair are coaxially arranged as is apparent from FIGS. 6 and 7. The drums 63, 64, 67 and 68 are on the same level whereas the drums 65 and 66 are on a higher level. Each drum has a guy cable wound therearound and extending therefrom, with the cables being identified by the same reference numeral as the drum, but differing by the use of the letter "a"; hence cables 63a, 64a, 65a, 67a and 68a.

The cables extend upwardly through the lower section 13a and then into tubular guides 71 (FIGS. 6 and 9) which extend almost the full length of the intermediate section 13b. The guides terminate near the upper end of the intermediate section 13b, as shown in FIG. 9. The guides 71 are secured to and extend through a series of plates 73 (see FIGS. 11 and 12), which are fixed to the interior of the intermediate section in spaced relation therealong. The ends of the guides are preferably belled (FIG. 6) for ready travel of the cables into and out of the guides.

The guy cables extend freely through the upper sections 13c and then extend through a top plate 81 of the upper section and a sheave mounting plate 82 which is bolted to the top plate 81. The cables 63a–68a then extend around sheaves 63b–68b, respectively (FIG. 10), which are rotatably mounted in suitable sheave supports 83 fixed to the plate 82. The cables then extend around suitable pulley blocks 85 (FIG. 4); there being one block for each cable. Then the cables are returned to the top plate 82 where they are dead ended to suitable eyes 87 (FIG. 9) which are pivotally mounted by bolts 88 in straddling relation to the plate 82. A guy line extension 89 (FIG. 4) is provided for each guy cable.

Returning to FIGS. 6, 7 and 8, the driving arrangement for the winch drums will be explained in connection with drums 63 and 64. Both drums are rotatably mounted on a single shaft 91 which is rotatably mounted by bearings (not shown) in a pair of removable angle plates 92 bolted to a pair of fixed angle plates 92a secured on the walls of the base section 13a of the spar. The shaft is additionally supported by a speed reduction gear box 93 (FIG. 7) mounted on a support channel 95, which is secured to the walls of the base section 13a.

For simplicity, the gear box is shown as containing a single worm 101 meshing with a single worm gear 103. The gear 103 is fixed on the shaft 91. The worm 101 has a shaft 105 (FIG. 8) which projects through the wall of base section 13a and through an access plate 107 which is bolted to the base section 13a to cover an access opening 109. The outboard end of the worm shaft 105 is of square cross section to enable a motor, such as a chain saw motor, to be detachably connected to the worm shaft to drive it and hence drive the drum shaft 91.

A pair of jaw identical clutches are used to connect the shaft 91 to the winch drums 63 and 64. Each clutch comprises a first part 111 slidably keyed on the shaft 91 and a second part 113 fixed to the associated drum. A clutch lever 115 is used to engage and disengage a clutch and has an end exposed by a hole 116 in the wall of the base section 13a to enable the clutch to be operated from the exterior of the base section.

Each drum has a ratchet 117 (FIGS. 7 and 8) fixed thereto and each ratchet has a pawl 119 (FIG. 8) which is spring biased into engagement with the ratchet and is accessible through a suitable opening 120 in the base section.

The manner of operating the drums is apparent from the above description. When it is desired to tighten a particular guy cable, the associated clutch is engaged, while the clutch for the mating drum is disengaged. A motor is connected to the worm associated with the drum shaft 91 to be rotated and the worm driven to rotate the shaft. The associated pawl 119 merely clicks on the associated ratchet 117. After the slack has been taken up in the guy cable, it may be desirable to complete the tensioning operation by manually turning the worm with the aid of a wrench.

When the guy lines become taut, they may tend to turn the upper section 13c slightly to attain the optimum orientation of the sheaves 63b–68b and the guy line anchors. This is permitted because the upper section is slidably and rotatably received by a sleeve 121 (FIG. 9) fixed in the upper end of the intermediate section 13b. The upper section 13c has a collar 123 on its lower end resting on a circular flange 125 fixed to the upper end of intermediate section 13b. Turning movement of the upper section 13c is limited by a bolt 127 which extends through an arcuate slot 128 in a plate 129 secured to the collar 123.

The upper section 13c has means for receiving a block for the main line and a block for the haul-back line. This means comprises upper and lower split rings 131 and 133 (FIG. 9), rotatably surrounding the upper section and having eyes 135 and 137, respectively. The upper ring is contained between a pair of collars 139 and 141 surrounding and secured to the upper section 13c, whereas the lower ring is contained between an upper collar 142 and the collar 123, previously mentioned.

The spar also has provision for buckle guy lines. Referring to FIGS. 1, 11 and 12, the spar has a buckle guy plate 140 in the form of a ring contained between two retainers 143 which are secured to the interior of the intermediate section 13b. The section is slotted at 145 (FIG. 11) to receive portions of the guy plate 140. The plate 140 is provided with eyes 147 for dead ending one set of ends of the buckle guys. The other ends are secured to any suitable places on the ground, such as stumps.

The purpose of the buckle guys is to prevent falling of the spar in the event one or more of the main guy cables snap or become released.

The pivotal connection between the boom 11 of the arch and the spar 13 is best shown in FIG. 6. There it is apparent that the base section 13a of the spar 13 is provided with a clevis unit 151 receiving oppositely extending trunnions 153 on the upper end of the boom 11. The clevis unit is formed with vertical tapered bores to receive a pair of tapered pins 155 which are pounded into place to removably retain the trunnions 153 within the clevis unit 151. If desired, bolts instead of tapered pins could be used.

Erection procedure

Assuming that the portable spar apparatus is in the general locale of its intended use, it will be driven to the desired logging area in the condition shown in FIG. 1, with the guy lines 63a–68a strapped to the spar. The spar 13 at this time is jointly supported by the arch A and the rest device 15 on the tractor T. The erection line 17 is slack, and thus the base block 28 will assume a position at which the truss cables 41 are slack.

When the logging area is reached and the erection spot determined, the anchors (usually trees or stumps) for the guy lines and the buckle guy lines will be selected. Since two of the guy line anchors will be located to the right of the spar, as the spar is shown in FIG. 1, the guy lines for these two anchors should be relatively long with respect to the remaining guy lines. If the mentioned two guy lines are not already of proper length (such as having been left in such condition after previous use of the spar), the clutches and pawls for winch drums 67 and 68 are disengaged to enable the associated cables 67a and 68a to be pulled out to proper length. Then the pawls are reset.

The remote ends of the guy line extensions are now anchored in place with sufficient slack in these lines to enable the spar 13 to be raised without interference by these lines (such as by premature tensioning of them).

The main line and haul-back line are now threaded through their blocks (which are suspended from eyes 135 and 137, FIG. 9), and the buckle guy lines (if used) are connected to the eyes 147 in FIG. 12. The latter may already be connected, if previously used, and merely strapped to the spar during transportation of the spar from one place to the other.

It is contemplated that two donkeys will be used for operating the main and haul-back lines, although these lines could be operated by other power winches on the tractor T (which winches would be provided, if this type of operation were intended).

Figure 4:
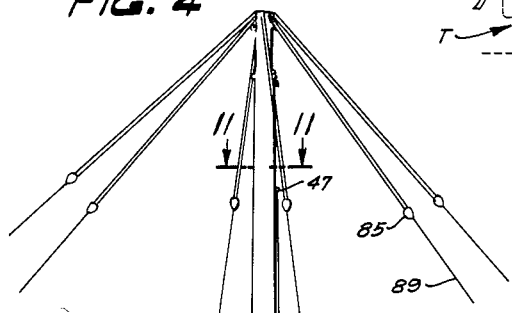

Now, the spar is ready to be erected. This is done by hauling in the line 17, which action pivots the base block 28 to tension the truss cables 41, after which, the spar 13 is lifted from the rest device 15 as shown in FIG. 2. As the spar 13 nears its vertical position as shown in FIG. 3, the base block 28 is positioned for proper engagement with the ground, i.e., the leading edge of the base block cannot dig into the ground since it is held at a higher level than the rear edge. In fact, the rear edge will engage the ground first and force the front edge down. This action will release the tension in the truss cables 41, as is shown in FIG. 4.

Now, the guy lines 63a–68a are tensioned in the manner previously recited. Preferably, the slack in these lines is first taken out of all the lines, then opposite lines tensioned.

One buckle guy line will be of excessive length, and this can be taken up from the ground so that all guy lines are only slightly slack.

If donkey operation of the main haul-back lines is contemplated, the erection line 17 may be disconnected from the arch A at 26a and hauled in to unthread it from the sheaves about which it is reeved. Next, the pins 155 are removed enabling the tractor T and the arch A to be driven away for other uses.

When it is desired to take the spar down, the tractor T and arch A are backed into proper position to fit the trunnions into the clevis unit 151. The pins 155 are replaced and the erection line 17 rethreaded and connected at 26a to the arch A.

Next, the buckle cables are released, and the clutches and pawls for the guy cables 67a and 68a and also 65a and 66a are released to slacken these cables. Normally, the tension in the remaining cables 63a and 64a is sufficient to pivot the spar toward its downward position. If not, the tractor T and arch A can be backed up a short distance to cause such pivoting movement.

Once the spar is inclined, it will continue its pivoting movement as the cable 17 is payed out. The weight of the spar will tension the cable 17, which will pivot the base block 28 to tension the truss cables 41 to reinforce the spar against undue deflection. When the spar is brought to rest on the rest device 15, the cable 17 and thus the truss cables 41 become slack.

Now, the guy lines, guy line extensions and buckle lines are strapped to the spar 13. The main line and haul-back line may be unthreaded from their blocks while the spar is erect or after it comes to rest on the device 15.

The spar apparatus of the invention can be erected in a few hours, and afterwards the tractor T and arch A can be disconnected for other uses. However, if the main and haul-back lines are to be operated from drums on the tractor, the tractor and arch are not disconnected from the spar. Since the ordinary logging operator will have donkeys on hand, separation of the tractor and arch from the spar is normally contemplated. The separated tractor will have many uses during the logging operations which need not be detailed.

Having described the invention in what is believed to be the preferred embodiment thereof, it is desired that it be understood that the invention is not to be limited other than by the provisions of the following claims.

I claim:

1. A mobile spar apparatus comprising:
   vehicle means,
   a spar member pivotally mounted on said vehicle means for movement from a horizontal position to a vertical position,
   means for effecting separation of said spar member and vehicle means after said spar member is in its vertical position,
   said spar member including a spar element and a base block pivoted on the lower end of said spar element,
   truss cable means connected to the upper portion of said base block in the horizontal position of said spar element and to the upper portion of said spar member,
   and a winch drum on said vehicle having an erecting cable reeved about sheave means on the spar element and then about sheave means on said vehicle means and then about sheave means on the lower portion of said base block in the horizontal position of said spar element and then releasably anchored to said vehicle means so that reeling in said erecting cable pivots said block to tension said truss cable means and then elevates said spar member.

2. A mobile spar apparatus comprising:
   vehicle means,
   a spar member pivotally mounted on said vehicle means for movement from a horizontal position to a vertical position,
   means for effecting separation of said spar member and vehicle means after said spar member is in its vertical position,
   said spar member including a spar element and a base block pivoted on the lower end of said spar element,
   truss cable means connected to the upper portion of said base block in the horizontal position of said spar element and to the upper portion of said spar member,
   a winch drum on said vehicle having an erecting cable reeved about sheave means on the spar element and then about sheave means on said vehicle means and then about sheave means on the lower portion of said base block in the horizontal position of said spar element and then releasably anchored to said vehicle means so that reeling in said erecting cable pivots said block to tension said truss cable means and then elevates said spar member,
   said spar member being hollow,
   guy cables extending from winch drums in said spar member through said spar member and out the upper portion thereof,
   and means for operating said winch drums,
   said vehicle means being separable from said spar member without interference by said guy cables, winch drums or the last named means.

References Cited by the Examiner

UNITED STATES PATENTS

| | | | |
|---|---|---|---|
| 2,694,474 | 11/1954 | Meany | 52—114 |
| 2,880,827 | 4/1959 | Gilmore | 52—120 |
| 2,921,697 | 1/1960 | Holmes et al. | 212—144 |
| 2,985,429 | 5/1961 | Le Tourneau | 254—139.1 |

RICHARD W. COOKE, JR., *Primary Examiner.*